(No Model.) 4 Sheets—Sheet 3.
J. S. BANCROFT & W. H. THORNE.
DRILL.
No. 270,366. Patented Jan. 9, 1883.
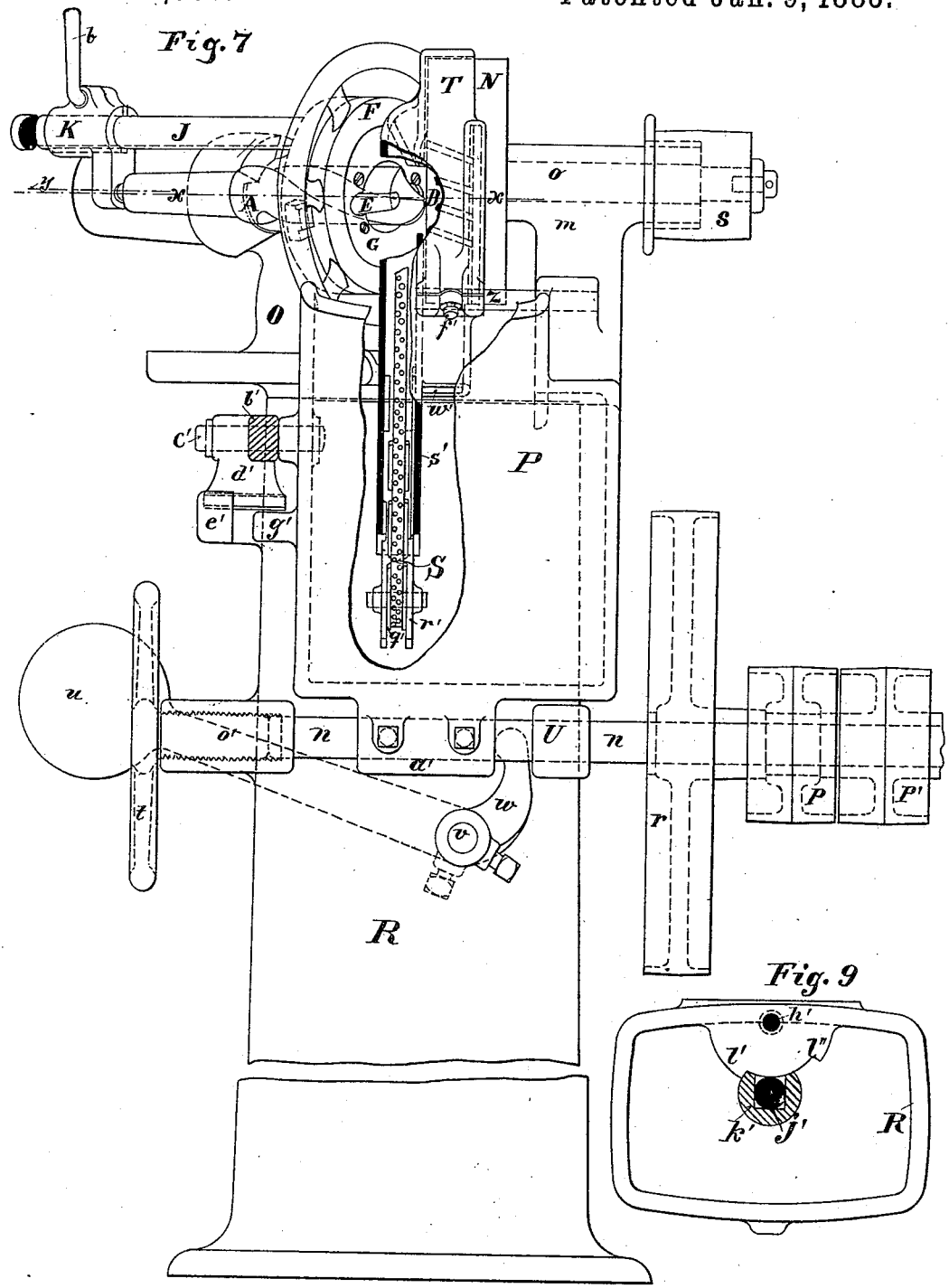
Witnesses:
Inventors:
J. Sellers Bancroft
Wm. H. Thorne

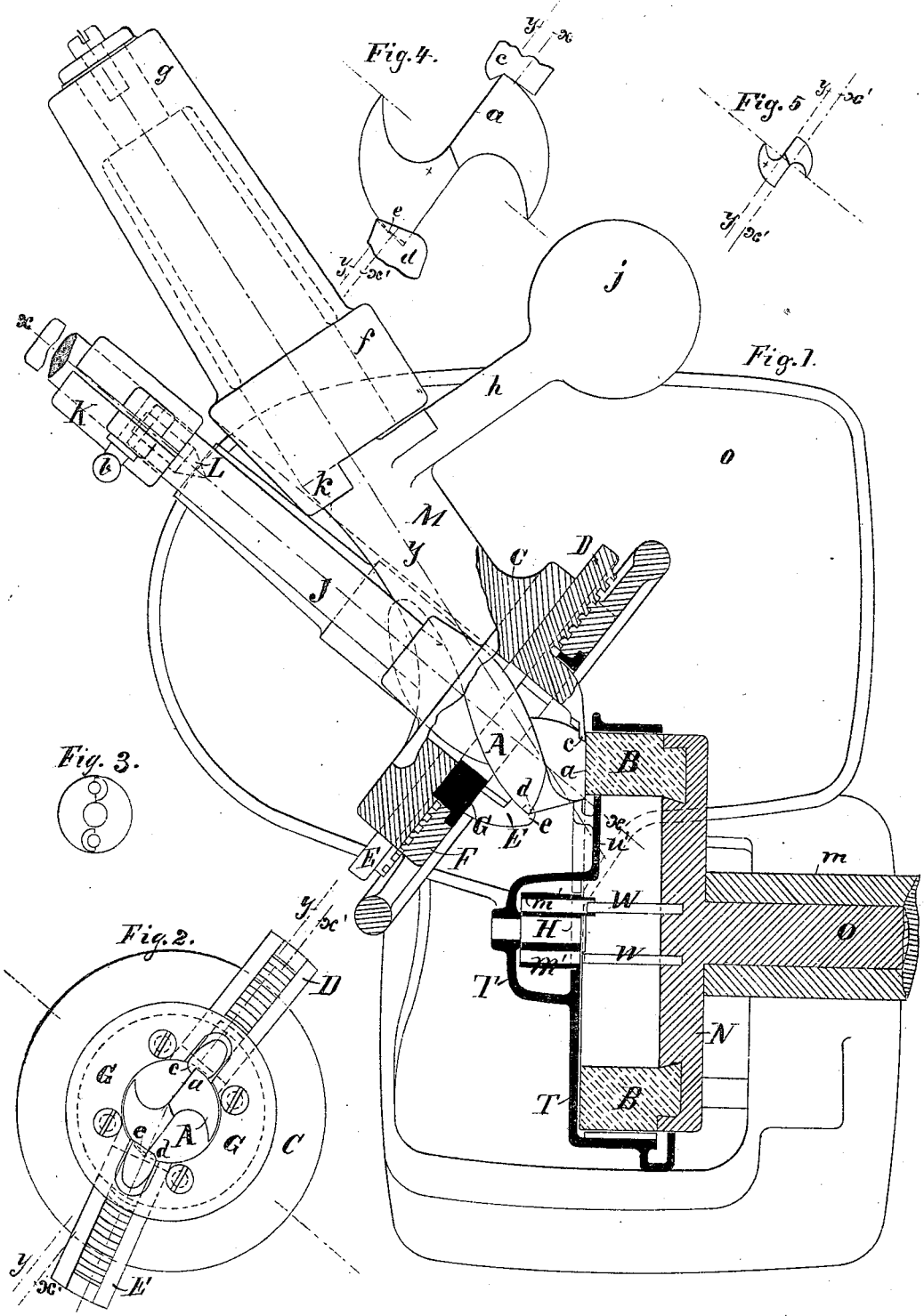

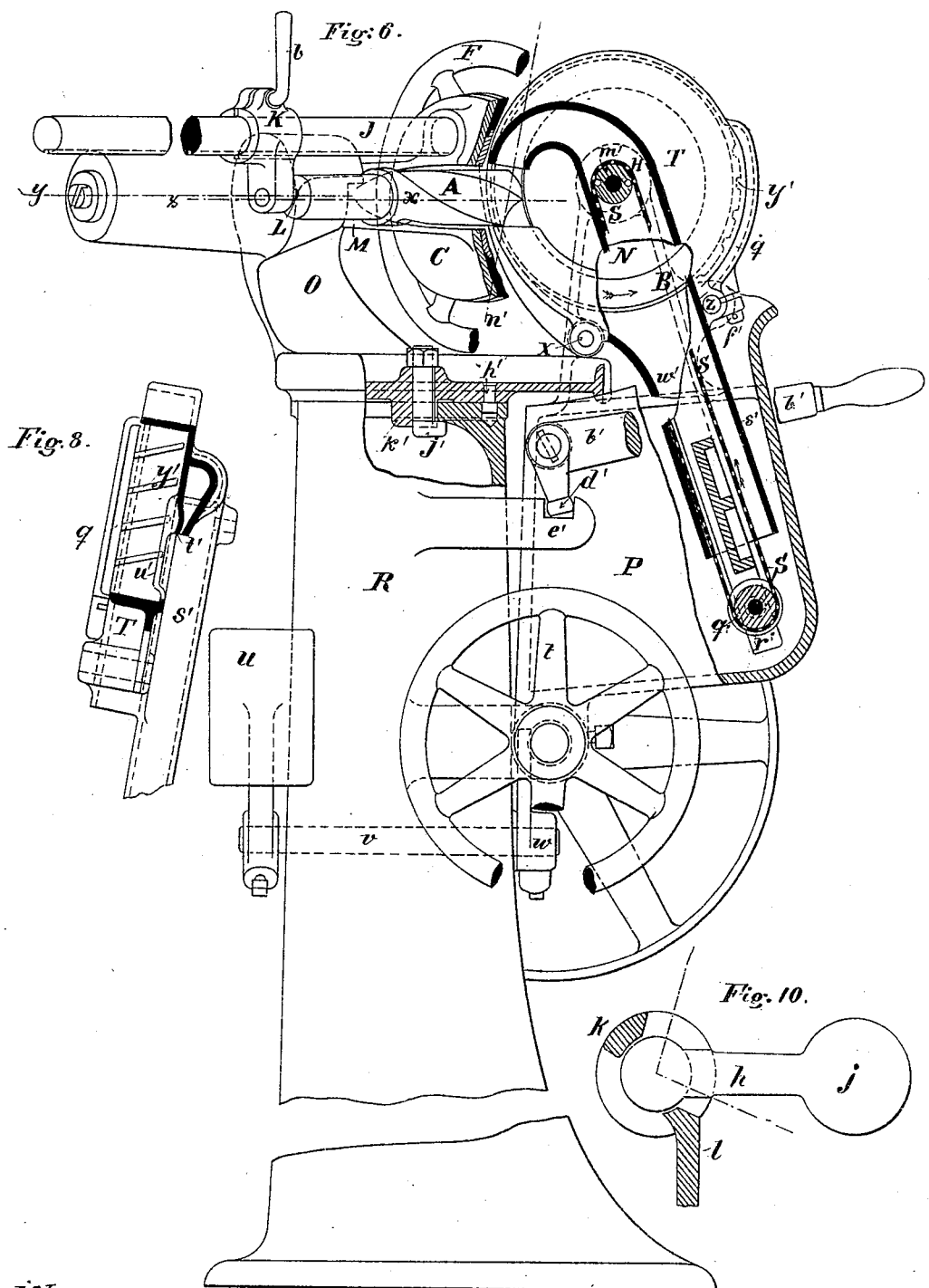

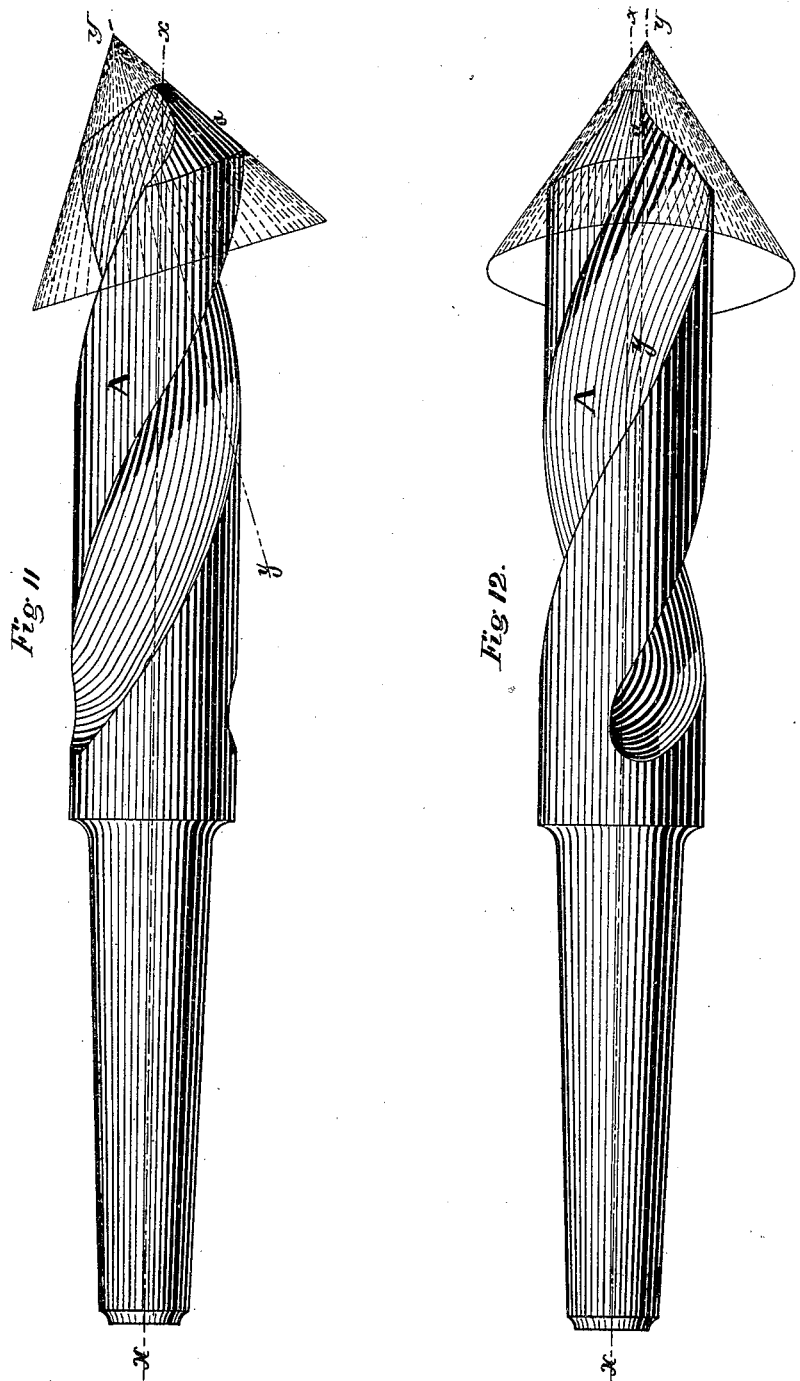

UNITED STATES PATENT OFFICE.

J. SELLERS BANCROFT AND WILLIAM H. THORNE, OF PHILADELPHIA, PENNSYLVANIA, ASSIGNORS TO WILLIAM SELLERS, OF SAME PLACE.

DRILL.

SPECIFICATION forming part of Letters Patent No. 270,366, dated January 9, 1883.

Application filed April 22, 1882. (No model.)

*To all whom it may concern:*

Be it known that we, JOHN SELLERS BANCROFT and WILLIAM H. THORNE, of the city and county of Philadelphia, and State of Pennsylvania, have jointly invented certain new and useful Improvements in Drills; and we hereby declare the following to be a full and accurate description thereof, reference being had to the accompanying drawings, which form part of this specification.

To drill true holes, which shall all have the same diameter and also the closest approximation to the size of the drill, it is necessary that the two cutting edges or lips of the drill should be of precisely the same length and at the same angle with the axis of the drill, and to obtain the greatest drilling effect, it is requisite that the backing or clearance of the two lips should conform as closely as possible near the cutting-edge to the shape of the bottom of the hole produced by the drill, so as to give the greatest strength and support to the cutting-edges, while giving sufficient clearance to enable the drill to cut freely without binding. As the shape of the bottom of the hole is a right cone with the apex truncated by the point of the drill, it will be evident that the best shape for the end of the lip of a drill will be that of the surface of a right cone having its axis sufficiently eccentric to the axis of the drill to give the proper clearance to the edge.

The importance of sharpening drills by machinery has long been known, and numerous devices have been employed for the purpose, but all of them heretofore have been unsatisfactory, both in the shape produced and in the means for holding the drill. The shape or clearance of the cutting-edge has been obtained in some machines by rocking the drill when held in a chuck about an axis parallel with the edge to be ground. This is objectionable, as giving a uniform and cylindrical form of clearance over the whole length of the cutting-edge. In this shape the clearance cannot be at the best angle at all points, but will be excessive at some, and the edge at such places will be weak, so that the drill will wear irregularly and require frequent sharpening. In other machines the drill is moved forward by a cam, while it is rocked about an axis parallel with the cutting-edge. This plan merely changes the shape of the lip from cylindrical to some other curve, which, however, is still uniform over the whole length of the lip, and is therefore open to the same objection as the first. In some cases an attempt has been made to obtain the necessary clearance by rotating the drill about its own axis, and at the same time swinging it sidewise, and also in some cases giving it at the same time a slight forward movement by a cam. These devices are necessarily complicated and expensive to manufacture and difficult to keep in order, and, moreover, are not adapted to drills of different diameters, while the resultant surface is not that of a right cone, and hence the clearance produced is always excessive at some points in the cutting-edge.

All of the devices heretofore used for holding the drills while being sharpened are objectionable, as not defining the position of the cutting-edge with sufficient exactness. The chucks are usually adapted for twist-drills only, and there is nothing to limit the distance the drill may project from the chuck, which distance therefore must depend upon the skill of the workman; but as each variation in this distance produces a change in the curvature and clearance of the cutting-edge, uniformity in shape is not practically attainable. Heretofore no adequate means have been provided to define the position of the cutting-edges with reference to any given point in the chuck which rotates it—that is, the drill may be clamped in the chuck so that the rotation of the latter may not produce any clearance, or it may be excessive, or the highest point may even be back of what should be the cutting-edge. To avoid this trouble the drill has been laid in a grooved bed, provided with a projection for the purpose of fixing the position of the drill, one lip of the drill resting against this projection while the opposite edge is being ground. This device is evidently applicable only to twist-drills, and any variation in the spacing of the flutes in the drill will change the clearance of the two lips, while any differences in the longitudinal position of the drill will rotate the lips and thus change the clearance materially. It is also evident that if the drill is not perfectly straight the position of the point will vary as the drill is turned over, and that consequently the two lips will vary in length and the drill will make a hole larger than its own diameter.

To remedy these defects it is the object of our invention to shape the cutting end of a drill so as to increase its efficiency and durability; and to this end our invention consists in grinding the end surface of each lip of the drill to a right cone or to a conical surface, the apex of which cone or conical surface is beyond the point of the drill, while its axis is not parallel to nor does it meet the axis of the drill, and in providing the requisite clearance back of the cutting-edge by adjusting the angle of the axis of this cone with reference to the axis of the drill, and its position with reference to the cutting-edge.

The rationale of our invention is as follows: If we suppose a hollow right cone to be revolving about a horizontal axis, and its interior surface to be provided with some abrading substance, and that the lips of a drill are inserted into this cone in such manner that the axis of the drill shall coincide with that of the cone, it will be evident that the end of the drill would be shaped to a right cone, but would not have the proper shape for cutting, as the center of the drill would be a point which could only enter any material to be drilled by punching or abrasion, while the lips back of the edges of the drill would have no clearance, and hence the drill would merely rub without cuttting. If, now, we suppose one edge of a lip of this drill to be horizontal, and we move the drill away from the axis of the abrading-cone on a horizontal line, and at the same time lower the drill so that the cutting-edge will be slightly below the center of the cone, and that we present the drill against the abrading-cone in this position, the back of the lip will be ground away first until the cone touches the cutting-edge. If the drill is now withdrawn and turned half around, and the other lip presented in the same position, it will result that the end of each lip will be ground to the shape of a right cone, and the point of the drill will be convex, like a bow-drill, for cutting in both directions, being formed by the intersection of the cones forming each lip. This gives the best possible shape for the drill-point, and the clearance will evidently be exactly adapted to the shape of the bottom of the hole to be produced by the drill. The distance that the center of the drill is moved from the apex of the cone depends upon the thickness of the central part of the drill; and to avoid excessive clearance on the outside of the drill-lip, it is found advantageous in practice to reduce the included angle of the hollow cone so that the radius of the cone where it touches the outside corner of the drill-lip is but little greater than the radius of the drill itself for the largest drill the machine is intended to grind. This requires that the axis of the drill shall not be coincident with nor parallel to the axis of the grinding-cone, and it follows that the clearance of the drill-lip will increase slightly from the outside corner of the cutting-edge to the point of the drill. The shape of the end of the lip of the drill will be part of the surface of a right cone, the axis of which is coincident with that of the grinding-cone, and it is evident that the same shape of lip would be produced if the grinding-cone was stationary and the drill was revolved, not about its own axis, but about the axis of the grinding-cone, and it follows that the same shape would be produced by a grinding-wheel, the cutting-surface of which is tangent to a side of this grinding-cone and arranged to swing about the axis of this cone, the drill in this case being stationary; and, conversely, the grinding-wheel can be arranged so as to revolve about a fixed axis, with its cutting-surface tangent to a side of the right cone to which the end of the drill-lip is to be formed, the drill in this instance being revolved or swung about the axis of this cone. These methods will all produce precisely the same form of end to the lip of a drill, and as the method last described has many mechanical and practical advantages, the drawings annexed represent a machine constructed on this plan and adapted for this purpose, but which forms no part of the invention claimed herein, said machine being claimed in another division of this application.

In the accompanying drawings, Figure 1, Sheet 1, represents a plan of the drill-holding device and grinding-wheel, partly in section. Fig. 2 is an end view of the chuck, showing the relative position of the clamping-jaws. Fig. 3 is an end view of the pump-pulley. Figs. 4 and 5 are end views of drills of different sizes, showing variation of position with diameter of drill. Fig. 6 represents an elevation of the machine, partly in section, with the drill chuck broken away to show the pump and shield. Fig. 7 is an elevation at right angles with Fig. 6. Fig. 8 is a section through the deflecting-shield on the line $n'\ n'$. Fig. 9 is a plan of top of post. Fig. 10 is a section through the bearing for drill-chuck, showing stops for lever. Fig. 11 represents a drill, A, with the end surface of the lip $a$ formed to the contour of a right cone, the axis of which is the line $y\ y$, the line $x\ x$ representing the axis of the drill; and Fig. 12 is a view at right angles to Fig. 11.

In all the figures similar letters refer to similar parts.

A, Fig. 1, represents a drill held in position for sharpening its lip $a$ against the grinding-wheel B. The chuck C has two jaws, D and E, sliding freely in grooves in the face of the chuck C, and held in place by the ring G, under which they slide easily, being moved in and out for the purpose of clamping the drill by means of the hand-wheel F, which is provided on its inner face with a scroll-thread, which fits and engages with a corresponding scroll-thread on the jaws D and E. The hand-wheel F is held in position by a flange on the ring G, as shown.

Projecting from the back of the chuck C is a rod, J, which carries a cross-head, K, provided with a center, L, which is concentric with the center of the chuck. The rod J has a key-seat extending its entire length, in which slides a feather secured in the cross-head K. This keeps the center L always in the line of the center of the chuck. The cross-head K is clamped to the rod J in any desired position by the screw $b$. The center L carries the end of the drill A, the front end being clamped firmly close to the edge of the lips by the jaws D and E. The position of the drill-lips in these jaws is determined by the stops $c$ and $d$, against which the lips of the drill are rotated by hand before clamping. The position of the drill endwise—that is, the distance that the end of the lip projects from the face of the chuck—is determined by the stop $e$ in the jaw E. These three stops $c\ d\ e$ thus determine the exact position of the lips of the drill with reference to the grinding-wheel and the axis about which they are swung, and as the jaws seize the drill close to the lips, and by a short bearing only, there is no danger of springing any drill to be sharpened.

The chuck C is formed with a shaft or arbor, M, projecting from it, and which is fitted so as to turn freely in the bearings $f\ g$, formed with or secured to the stand O. The shaft M is formed with a shoulder and provided with a bolt and washer at the bearing $g$, so that it has no end play. The chuck C, and with it the drill A, can be rotated about the axis $y\ y$ of the shaft M by means of the lever $h$, which is formed with a counter-weight, $j$, for the purpose of balancing the weight of the drill. The bearing $f$ is provided with stops $k\ l$, to limit the rotation of the chuck in each direction. In all the drawings the chuck C is shown in that point of its revolution where the axis $x\ x$ of the chuck C is horizontal. The axis $x\ x$ is not in the same plane with the axis $y\ y$, but lies below it, as shown in Figs. 2, 4, 5, 6, and 7. In Fig. 1 it will be seen that the axis $y\ y$ of rotation of the chuck makes an angle with the axis $x\ x$ of the chuck itself, and also with the cutting-face of the grinding-wheel B. If the wheel B be driven and the chuck swung in its bearings $f\ g$, it follows that anything held in the chuck C and against the grinding-wheel will be ground to the shape of a right cone, the axis of which is the line $y\ y$. Fig. 1 represents the drill A as having its lip $a$ sharpened entirely to one side of the axis $y\ y$, and the cutting-edge of this lip $a$ is represented as just touching the grinding-wheel. If the chuck C be now swung in its bearings, by moving the lever $h$ toward the stop $k$ the end of the lip $a$ of the drill will be ground to the shape of a right cone, the axis of which is the line $y\ y$ and the apex is the point where the line $y\ y$ is cut by the face of the grinding-wheel; and as the cutting-edge of the lip $a$ is nearly on the same plane with the axis $y\ y$, the axis $x\ x$ of the drill and chuck being farther below it, it follows that the end of the lip will have a regular clearance back of the cutting-edge, and by trial a relative position will be found for the axes $x\ x$ and $y\ y$ and the stops $c\ d\ e$, which will give the combination of the greatest strength of lip with the most efficient cutting-edges. This position is determined in the construction of the machine, and the operator has only to bring the lips of the drill against the stops before clamping the drill in the chuck to insure the constant production of the best shapes. When one lip of the drill is ground the jaws are released by turning the hand-wheel F, and the drill is turned half-way round until the opposite lip comes against the stops $c$ and $d$, the drill being held against the back center, L, and clamped in this position. If the chuck is now swung in its bearings the second lip of the drill will be ground to precisely the same length as the first lip, $a$, and will have precisely the same angle and clearance, and the drill will then produce a hole as nearly as possible of its own diameter.

It will be seen from Fig. 2 that the center lines of the two jaws D and E are not in one line, but are inclined to each other. This is to compensate for the difference in the thickness of the centers of large and small drills. Fig. 4 shows a large drill, held in the jaws, with its cutting-edges resting against the stops $c$ and $d$; and it will be seen that the line $x'\ x'$ passes through the center of the drill, and the line $y\ y$ lies just above the cutting-edge of the lip $a$ of the drill. Fig. 5 represents a small drill in the same position in the jaws; but the upward movement of the jaws, due to their angle with each other, brings the cutting-edge into almost the same position with reference to the line $y\ y$ as the large drill, while the center of the small drill is considerably above the line $x'\ x'$. On reference to Fig. 1 it will be seen that the jaws D and E move in a plane at right angles to the axis of the drill, so that the stop $e$ always remains at the same distance from the face of the chuck C. From this it results that the point or center of the drill will vary in its distance from the chuck according to its diameter, the point of the small drills being much nearer to the chuck, and hence nearer to the axis $y\ y$. This brings the point or center of the drill nearer to the apex of the cone in one direction, and the angle of the jaws above described brings it closer in the other direction. Hence small drills are sharpened to a curve of smaller radius than the large drills, and all drills will have the same correspondence to the shape of the end of the hole produced, the curvature in all cases being proportioned to the diameter of the drill, and both these movements are made automatically without depending upon the skill of the operator. The different position of the center of rotation with reference to large and small drills is shown by the small cross on the line $yy$ in Figs. 4 and 5 for a large and a small drill, respectively.

The annular grinding-wheel B is fastened to the plate N, secured to or formed on the shaft $o$, which is fitted so as to revolve freely in the bearing $m$ in the vibrating frame P, which is secured to the shaft $n$ by set-screws, as shown. The shaft $n$ turns and slides freely in bearings U $o'$, formed on the main post R of the machine, and carries the pulleys $p$ and $p'$ and $r$. $p$ is secured to the hub of the large pulley, $r$, which runs loose on the shaft $n$ and drives the grinding-wheel by the pulley $s$, secured to the shaft $o$. The bearing $o'$ is provided with a screw-thread at one end, in which the screwed hub of the hand-wheel $t$ fits. The shaft $n$ is forced against the hub of the hand-wheel $t$ by the counter-weight $u$, secured to the shaft $v$, to which is also secured the lever $w$, which presses against the hub or bearing $a'$ on the bottom of the vibrating frame P. The hand-wheel $t$ moves the shaft $n$, and with it the frame P, carrying the grinding-wheel in one direction, and the counter-weight $u$ moves it in the other, and at the same time takes up all lost motion. The shaft $n$ thus serves as a counter-shaft to carry the driving-pulleys, as a slide-rest to move the grinding-wheel against the drill, and as a hinge or pivot for the frame P, which, for the purpose of keeping the cutting-face of the grinding-wheel true and free from ridges, is vibrated back and forth by the bell-crank lever $b'$, which is pivoted to the side of the frame P by the stud $c'$. The end $d'$ of the lever $b'$ fits in a groove or recess in the arm $e'$, which projects from the main post R. As the lever $b'$ is raised and lowered by the operator the end $d'$ works within the groove in the arm $e'$ as a gear-tooth works in a rack, and so moves the vibrating frame P back and forth, carrying the grinding-wheel past the end of the lip of the drill, and thus keeps the face of the wheel true. The weight of the vibrating frame P, being almost entirely to one side of the shaft $n$, keeps the arm $e'$ of the lever always against one side of the groove, and so takes up lost motion.

When the machine is not in use, or when the drill is being changed, the lever $b'$ rests against the projection $g'$ on the frame P, and so holds it from swinging too far back, while if it is desired to empty the tank which is formed in the frame P the small pin may be withdrawn from the fulcrum-pin $c'$ and the lever slipped sidewise until it clears the projection $g'$, when the frame can be swung back and the water emptied.

The stand O is pivoted on top of the main post R by the pin $h'$. The hook-bolt $j'$ clamps the stand O to the main post R and holds it securely in position. A projection, $k'$, from the stand O backs up the hook-bolt $j'$, and keeps it from turning, and at the same time strikes against the stops $l' l''$ on the top plate of the main post R. These stops confine the motion of the stand O within the angle to which the machine is adapted to grind the end of the drill. By means of this adjustment the drill may be sharpened, with the two cutting-edges forming an angle with each other, which experience has shown to be best adapted for general work; or the stand O may be moved against the other stop, $l'$, and secured by the bolt $j'$, and the edges of the drill will then be ground at a much more obtuse angle with each other for the purpose of drilling thin work—such as steel rails or boiler-work—or the stand O may be clamped at any position between the stops, so as to grind the end of the lips of the drill to the angle best adapted to the particular work in hand. The stand O is provided with a ledge or raised rim all round it to retain the water which is thrown on the drill, and to return it into the vibrating frame P, which forms the water-tank, from which the pump draws its supply.

The other parts shown in the drawings, but not herein particularly referred to, relate to the general operation of the machine, and are comprised in the subject-matter of the other division of this application, before mentioned. Such parts therefore need not be further described in this specification.

From the foregoing description it will be seen that the mechanism above described will produce upon a fly or twist drill a cutting-edge shaped to a right cone, the apex of which cone is beyond the point of the drill, while its axis is not parallel to nor does it meet the axis of the drill, and the same result will attend the operation of either of the several modifications described under the rationale of our invention; but we do not limit ourselves to the hereinbefore-described mechanism or modifications.

It will observed that in the foregoing specification we have shown and described a combination as producing a drill-lip having the contour of a right cone; but the advantages of our improvement may be embodied in a drill-lip having a contour not strictly that of a right cone, and such a contour may be imparted by the mechanism above shown and described. Thus, if the swinging mechanism for holding and presenting the drill to the grinding-surface should be arranged to present the drill to the periphery of the grinding-wheel instead of to the side thereof, the traverse of the grinding-wheel in this case to be parallel to this grinding-surface, the axis of the grinding-wheel, the line of contact with the drill at the periphery of the wheel, and the axis about which the chuck swings being in the same plane, the resultant contour will be that of a right cone; but if the axis about which the chuck swings should be inclined to this plane, the surface produced upon the end of the drill-lip would not be that of a right cone, because no part of this surface would be in a right line, but it would still be a conical surface, which would have the same clearance as the right cone we have described. We therefore do not limit ourselves to a drill-lip having the contour of a right cone; but,

Having thus described our invention, what we claim as new, and desire to secure by Letters Patent, is—

A drill in which the end surface of each lip is conical and the apex of the conical surface is beyond the point of the drill, while its axis is not parallel to nor does it meet the axis of the drill.

J. SELLERS BANCROFT.
WM. H. THORNE.

Witnesses:
  DANL. B. ELY,
  CHAS. M. MILLER.